United States Patent
McCollum et al.

(10) Patent No.: US 9,707,641 B2
(45) Date of Patent: Jul. 18, 2017

(54) LASER MICROMACHINING OPTICAL ELEMENTS IN A SUBSTRATE

(75) Inventors: Timothy A McCollum, Avon Lake, OH (US); Fumitomo Hide, San Jose, CA (US); Ian Hardcastle, Santa Cruz, CA (US)

(73) Assignee: Rambus Delaware LLC, Brecksville, OH (US)

( * ) Notice: Subject to any disclaimer, the term of this patent is extended or adjusted under 35 U.S.C. 154(b) by 545 days.

(21) Appl. No.: 14/347,680

(22) PCT Filed: Sep. 14, 2012

(86) PCT No.: PCT/US2012/055393
§ 371 (c)(1),
(2), (4) Date: Mar. 27, 2014

(87) PCT Pub. No.: WO2013/048781
PCT Pub. Date: Apr. 4, 2013

(65) Prior Publication Data
US 2014/0272329 A1    Sep. 18, 2014

Related U.S. Application Data

(60) Provisional application No. 61/540,082, filed on Sep. 28, 2011.

(51) Int. Cl.
*B23K 26/362* (2014.01)
*B23K 26/00* (2014.01)
*F21V 8/00* (2006.01)

(52) U.S. Cl.
CPC ........ *B23K 26/0066* (2013.01); *B23K 26/362* (2013.01); *G02B 6/0001* (2013.01); *G02B 6/0065* (2013.01); *Y10T 428/24802* (2015.01)

(58) Field of Classification Search
CPC ...... G02B 6/001; G02B 6/0065; G02B 6/005; G02B 6/0033; G02B 6/0036;
(Continued)

(56) References Cited

U.S. PATENT DOCUMENTS 5,219,344 A * 6/1993 Yoder, Jr. ............ A61F 9/00804
128/898
5,866,913 A   2/1999 Robinson
(Continued)

FOREIGN PATENT DOCUMENTS

KR    1020070008677    1/2007

OTHER PUBLICATIONS

International Search Report and Written Opinion from corresponding International Application No. PCT/US2012/55393, mailed on Mar. 18, 2013.

*Primary Examiner* — John A McPherson
(74) *Attorney, Agent, or Firm* — Renner, Otto, Boisselle & Sklar, LLP

(57) ABSTRACT

Optical elements with small increments in average density are formed in a substrate by laser micromachining using a variable aperture and a pattern mask set of pattern masks each having of shape-defining elements whose density differs among the pattern masks in first density increments. A laser light beam passes through a combined mask formed by the variable aperture and one pattern mask selected from the pattern mask set. The variable aperture controls beam size and the pattern mask spatially modulates its intensity. A focusing element focuses light from the combined mask on a small averaging region of the substrate. Different combinations of the size of the aperture mask and the selected pattern mask are used in combination at respective averaging regions of the substrate. The resulting average densities of the optical elements vary among the averaging regions in
(Continued)

increments that are small compared to the first density increments.

21 Claims, 9 Drawing Sheets

(58) Field of Classification Search
CPC ... G02B 6/0035; B23K 26/0066; B23K 26/362; G03F 7/0005
USPC .......... 430/321, 945; 219/121.73, 121.82
See application file for complete search history.

(56) References Cited

U.S. PATENT DOCUMENTS

| | | |
|---|---|---|
| 6,507,034 B1 | 1/2003 | Nakasugi |
| 6,538,740 B1 | 3/2003 | Shiraishi et al. |
| 6,627,905 B1 | 9/2003 | Hirayanagi |
| 2007/0058259 A1* | 3/2007 | Hwang ............... G02B 3/0031 359/619 |
| 2009/0067178 A1* | 3/2009 | Huang ............... G02B 5/0242 362/326 |
| 2011/0062125 A1* | 3/2011 | Park ............... B23K 26/0604 219/121.8 |

\* cited by examiner

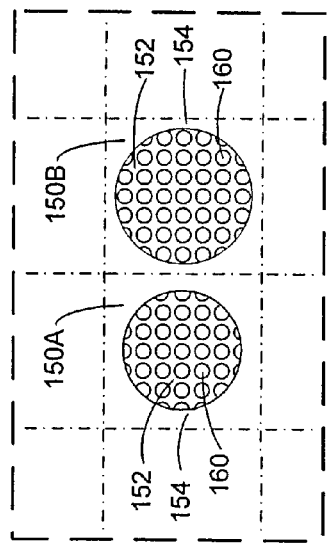
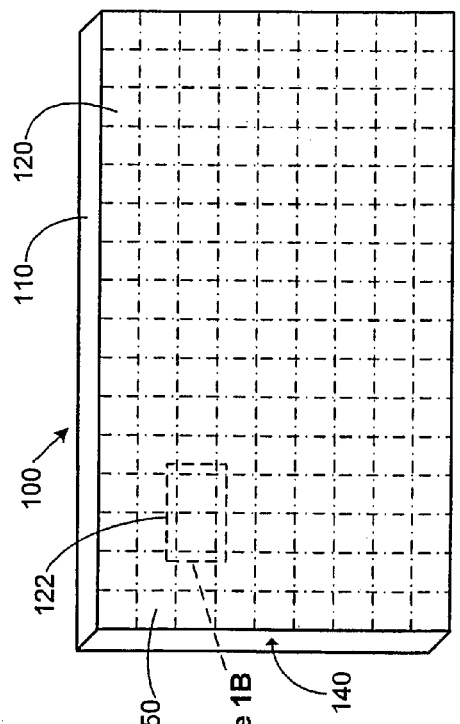
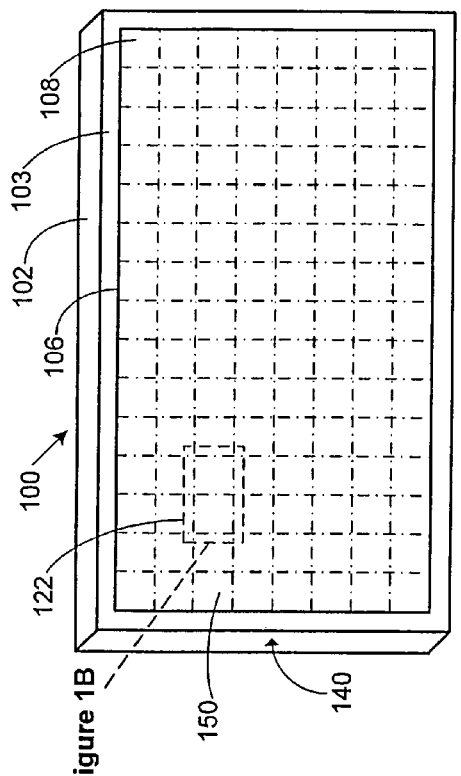

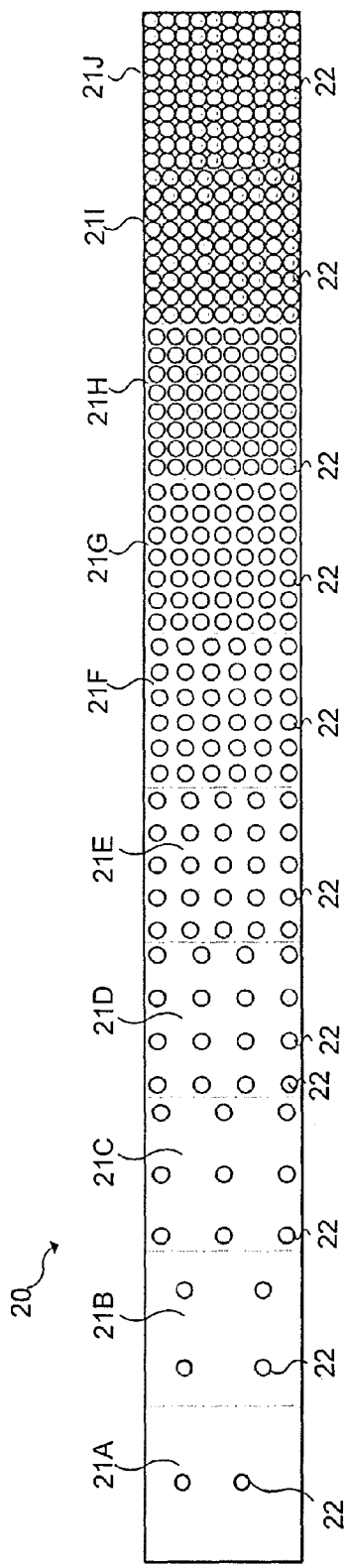
Figure 10
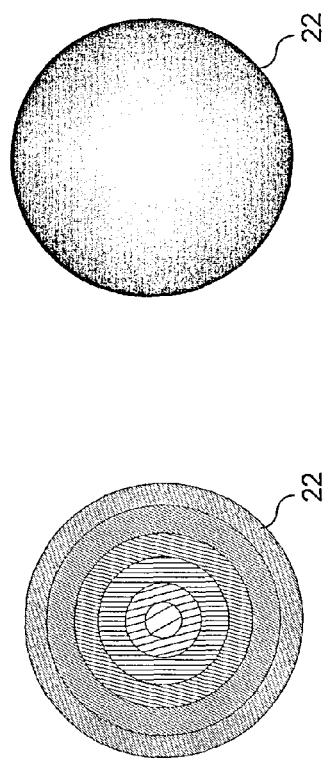
Figure 11B
Figure 11A

LASER MICROMACHINING OPTICAL ELEMENTS IN A SUBSTRATE

RELATED APPLICATION DATA

This application claims the benefit of U.S. Patent Application No. 61/540,082, filed Sep. 28, 2011, the disclosure of which is herein incorporated by reference in its entirety.

BACKGROUND

Conventional laser micromachining techniques for manufacturing a mold for use in forming a light guide involve forming small regions of light-extracting optical elements individually. This can require thousands of different masks to form the light-extracting elements. Due to the time required to interchange the different masks, such conventional techniques can require the manufacturing process to take several weeks to generate a mold to make a television-sized version of the light guide, for example. Conventional mechanical machining techniques are also very slow. Conventional chemical etch techniques do not provide defined light ray angle distributions and conventional density patterning techniques result in low pattern densities in which the individual light-extracting optical elements can be visible in a television-sized light guide.

An ability to create the light guides used in high-efficiency LED-based lighting and backlights quickly and inexpensively will hasten the rate at which LED-based lighting is adopted and the energy savings resulting from wide-spread use of LED-based lighting are realized.

BRIEF DESCRIPTION OF THE DRAWINGS

FIG. 1A is a schematic view showing an embodiment of a light guide.

FIG. 1B is an enlarged view showing two adjacent averaging regions of the light guide shown in FIG. 1A.

FIG. 2 is a schematic view showing a light guide having a light redirecting member affixed to a base layer

FIG. 10 is a schematic view showing an exemplary pattern mask.

FIGS. 11A and 11B are schematic views showing examples of shape-defining elements.

DETAILED DESCRIPTION

Figure 3A:
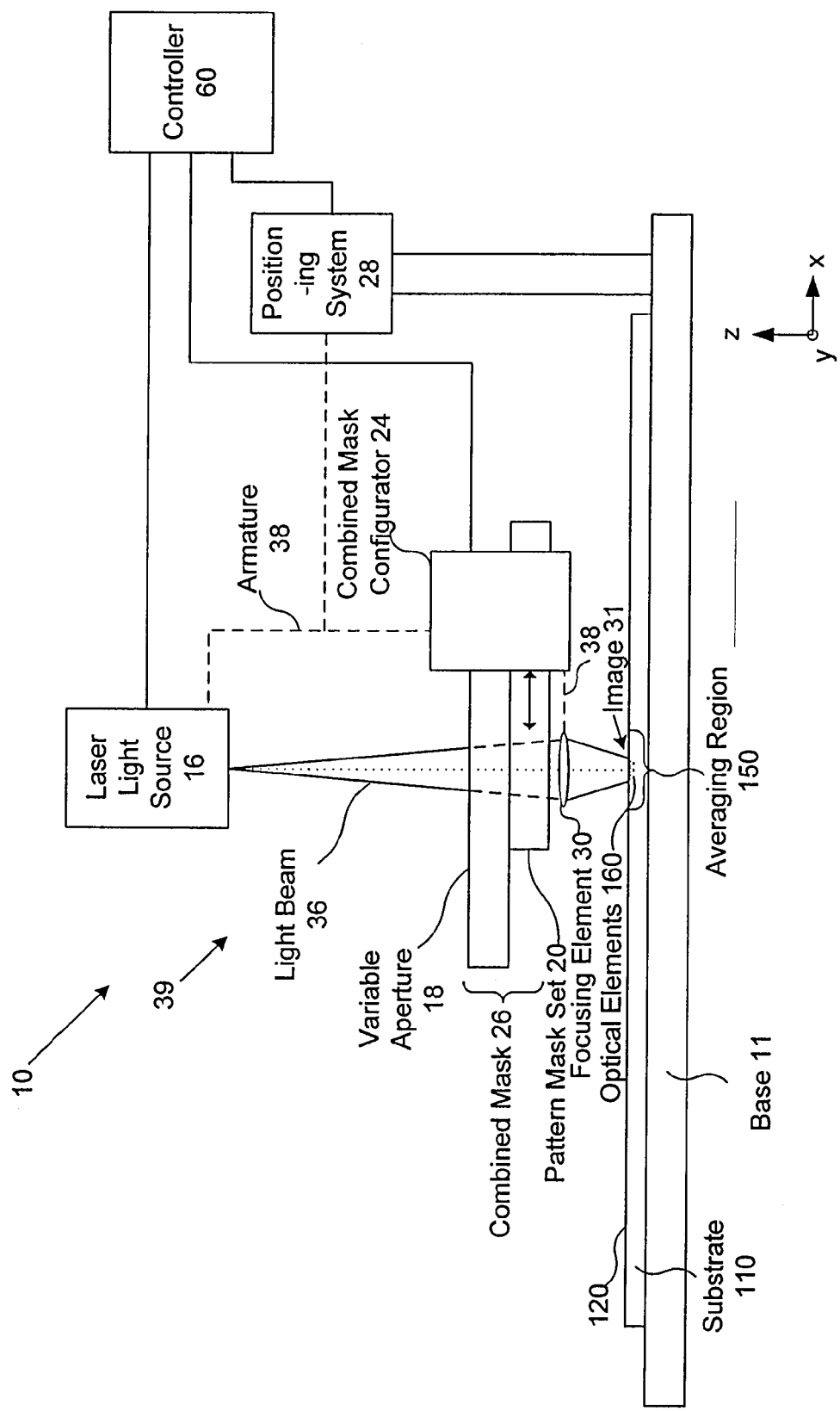
FIG. 3A is a schematic block diagram showing a laser micromachining system

Embodiments will now be described with reference to the drawings, in which like reference numerals are used to refer to like elements throughout. Reference numerals without appended letters refer to corresponding elements generically whereas reference numerals with appended letters refer to individual elements. The drawings are not necessarily to scale. Features that are described and/or illustrated with respect to one embodiment may be used in the same way or in a similar way in one or more other embodiments and/or in combination with or instead of the features of the other embodiments.

Aspects of this disclosure relate to a process and a laser micromachining system for forming optical elements on or in a substrate to make a light guide, or to make a tool for use in manufacturing light guides.

A light guide is edge lit at a light input edge by light from a light source that typically includes one or more solid-state light emitters. The optical elements are located on or in a major surface of the light guide to extract light from the light guide in accordance with a defined intensity profile. The intensity profile defines the variation of the intensity of the extracted light with position on the major surface. For example, a nominally-uniform intensity profile has a spatial variation of intensity less than ±10% relative to the mean intensity. In most light guides, obtaining a defined intensity profile requires that the pattern of optical elements vary in light-extracting power depending on location in the major surface of the light guide. For example, to provide a uniform intensity profile, the pattern of optical elements increases in light-extracting power with increasing distance from the light input edge to compensate for the decrease in the intensity of the light propagating along the light guide with increasing distance from the light input edge. This decrease is mainly due to the extraction of light from the light guide. Additionally, lateral variations in light intensity in the light guide due to the light source typically having small solid-state light emitters call for lateral variations in the light-extracting power of the pattern of optical elements. The light-extracting power of the pattern of optical elements is increased by increasing one or more of such properties of the pattern of optical elements as density, size and depth of the optical elements. Finally, to extract the light with a defined light ray angle distribution, variations in the geometry of the optical elements with position on the major surface of the light guide are needed.

In conventional light guides, the density of the optical elements is varied by varying the pitch between adjacent optical elements and the pitch between adjacent rows or columns of the optical elements. This, and the need to vary the geometry of the optical elements, makes the process of making light guides or the tools to make light guides by conventional mechanical micromachining or laser micromachining extremely time consuming.

This disclosure describes light guides in which the density of the optical elements is varied with position on the major surface in a way that substantially simplifies the way in which the light guides are directly made, or in which a tool for use in manufacturing such light guides is made. The simplification is based on a realization that the light-extracting power of the pattern of optical elements can be varied by using a small number of densities of optical elements in the pattern in combination with varying the size of the active sub-regions in which optical elements are located instead of using a large number of densities of optical elements in the pattern. FIG. 1A is a perspective view showing a light guide 100 having a substrate 110 with opposed major surfaces one of which is shown at 120 and a light input edge 140. Optical elements (not individually shown in FIG. 1A, but shown at 160 in FIG. 1B) extend into substrate 110 from the major surface 120 thereof to extract light from light guide 100. In other examples, the optical elements extend into substrate 110 from the major surface opposite major surface 120, or from both major surfaces of substrate 110. In other examples, the optical elements protrude from one or both major surfaces of substrate 110.

The major surface 120 of substrate 110 is divided into an array of equal-sized averaging regions, an exemplary one of which is shown at 150. Reference numeral 150 is also used to refer to the averaging regions generically. FIG. 1B is an enlarged view showing two adjacent averaging regions 150A, 150B in a region 122 of the major surface 120 of substrate 110 shown in FIG. 1A. Each averaging region 150 is composed of an active sub-region 152 and a passive sub-region 154. The optical elements are located only within active sub-region 152 and have a defined density (fraction of area covered by optical elements) within the active sub-region. An exemplary optical element is shown at 160. Reference numeral 160 is also used to refer to the optical elements generically. Active sub-region 152 is called active because light extraction occurs within this sub-region. No optical elements are located within passive sub-region 154 so that no deliberate light extraction occurs within passive sub-region 154. Consequently, the light-extracting power of averaging region 150 is the light-extracting power of the optical elements 160 located within active sub-region 152 and is substantially the same as if the optical elements were evenly distributed over the entire averaging region 150 instead of being confined to active sub-region 152. The light-extracting power of averaging region 150 therefore corresponds to the density of optical elements 160 within active sub-region 152 averaged over the entire area of the averaging region 150.

The average density of optical elements 160 within each averaging region 150 is the product of the density of the optical elements in the active sub-region 152 of averaging region 150 and the fraction of the area of the averaging region 150 occupied by the active sub-region 152. Thus, the average density of optical elements within each averaging region 150 can be varied in small increments simply by keeping the density of the optical elements 160 within active sub-region 152 the same and varying the area of the active sub-region. This obviates the need to make correspondingly small increments in the density of optical elements throughout the entire averaging region 150. Eliminating the need to make small increments in the density of the optical elements substantially reduces the number of pattern masks needed to form the optical elements in the substrate.

In the example shown in FIG. 1B, the active sub-region 152 of averaging region 150A is smaller than the active sub-region 152 of averaging region 150B, but the density of optical elements 160 within the active sub-regions 152 of averaging regions 150A, 150B is the same. The size difference between the active sub-regions 152 of averaging regions 150A, 150B results in the active sub-region of averaging region 150A having fewer optical elements 160 than the active sub-region 152 of averaging region 150B, and averaging region 150A having fewer optical elements than averaging region 150B. Since averaging regions 150A, 150B are nominally equal in area, the average density of the optical elements in averaging region 150B is greater than the average density of the optical elements in averaging region 150A. As a result of the difference in the average density of the optical elements in averaging areas 150A, 150B, the light extracting power of averaging area 150B, which is further from light input edge 140, is greater than that of averaging area 150A, which is closer to light input edge 140. The differences in the areas of active sub-regions 152 are exaggerated in the example shown.

Since no optical elements 160 exist in the passive sub-region 154 of each averaging region 150 outside the respective active sub-region 152, no light is deliberately extracted from the light guide 100 in passive sub-region 154, and passive sub-region 154 appears dark. In applications in which discernable dark areas are unacceptable, density averaging as disclosed herein can be used provided that averaging regions 150 are made sufficiently small that the passive sub-regions 154 thereof are too small to be discerned by an observer. In applications in which discernable dark areas are acceptable, the averaging regions can be made larger. In some applications, the averaging regions can be made even larger to provide clearly-discernable dark areas for aesthetic effect.

Also disclosed herein is a laser micromachining system and process, each of which forms in a substrate indentations of well-defined shape and having small increments in average density. Since indentations of well-defined shape formed in a substrate can be used as, or can be used to form, optical elements 160 that perform light extraction or light redirection, such indentations are referred to herein as optical elements. Substrate 110 can be the plastic or glass substrate of a light guide 100 or a glass, plastic or metal substrate used as a tool for use in manufacturing light guides, or a glass, plastic or metal substrate used to make a tool for use in making tools for use in manufacturing light guides. The system and process can be used to form optical elements in a substrate with many small increments in average density without the need for an individual pattern mask corresponding to each average density.

The laser micromachining system and process disclosed herein form optical elements 160 in a substrate 110. The major surface 120 of the substrate 110 or a part of the major surface 120 in which optical elements are to be formed, is divided into averaging regions 150. Each averaging region has an active sub-region 152 and a passive sub-region 154. The laser micromachining system and process form optical elements 160 in the active sub-region 152 of each averaging region 150 of the substrate. The system and process combine a variable aperture 18 with a pattern mask 21 selected from a pattern mask set 20 having shape-defining elements with substantially larger increments in density to form the optical elements with smaller increments in average density. The variable aperture defines the size of the active sub-region 152 of each averaging region 150 in which the optical elements are formed. The density of the shape-defining elements in the selected pattern mask and the fraction of the area of the averaging region occupied by active sub-region 152 collectively define the average density of the optical elements formed in the averaging region. This enables the needed small increments of the average density of the optical elements to be obtained using substantially fewer pattern masks than would be needed to produce the same small increments in the density of the optical elements using conventional laser micromachining.

In this disclosure, the term light guide encompasses such articles of manufacture as light guides and certain light redirecting plates and light redirecting films that redirect light using features of well-defined shape formed on or in a surface with variable density. The term "optical element" is used to refer to a feature of well-defined shape having light extracting or light redirecting properties. The term optical element applies directly to light guides and light redirecting plates or films. Additionally, the term optical element is used herein to refer to a feature of well-defined shape in or on the major surface of a tool used in the manufacture of light guides.

The laser micromachining system and process described herein selectively removes material from a substrate to form indentations of well-defined shape in the major surface of the substrate. When the substrate is a slab of transparent glass or plastic, the article of manufacture made by the process or system can be used as a light guide or a light redirecting member. Moreover, the article of manufacture can also be used as a shim in a molding process that forms light guides in which the optical elements are protrusions from the surface. Processes, such as electroplating processes, are known in the art and can be applied to the article of manufacture to form durable mold shims and embossing belts that can be used to mass manufacture light guides and light redirecting members in which the optical elements are protrusions from the surface or indentations into the surface. Whether the optical elements are protrusions or indentations depends on the number of electroplating processes used. In the context of manufacturing using a molding or embossing process using a tool made from the article of manufacture, the term optical elements refers to features of well-defined shape in or on the major surface of the mold shim or embossing belt, or in or on the major surface of a tool used directly or indirectly to form such features of well-defined shape in or on the major surface of the mold shim or embossing belt.

As used in this disclosure, the term tool encompasses a mold core or a shim for use in a molding machine, an embossing tool used in a stamping process, and an embossing roll or belt used in a roll-to-roll embossing process.

FIG. 2 shows another example of light guide 100 in which the light guide includes a base layer 102 and a light extracting member 106. Base layer 102 has a major surface 103 devoid of light extracting optical elements. Light extracting member 106, which is configured as a film or a thin plate, has optical elements (160 in FIG. 1B) in or on its major surface 108 and is bonded to at least a portion of the major surface 103 of base layer 102 from which light is to be extracted. Optical elements 160 are located in the active sub-regions 152 of averaging regions 150 into which the major surface 108 of light extracting member 106 is divided. Light extracting member 106 is typically bonded to base layer 102 by an optical adhesive or another suitable adhesive. In this embodiment of light guide 100, light extracting member 106 can be made directly using the laser micromachining system and/or the process described herein, or a tool for use in manufacturing light extracting member 106 can be made using the laser micromachining system and/or the process described herein.

Figure 3B:
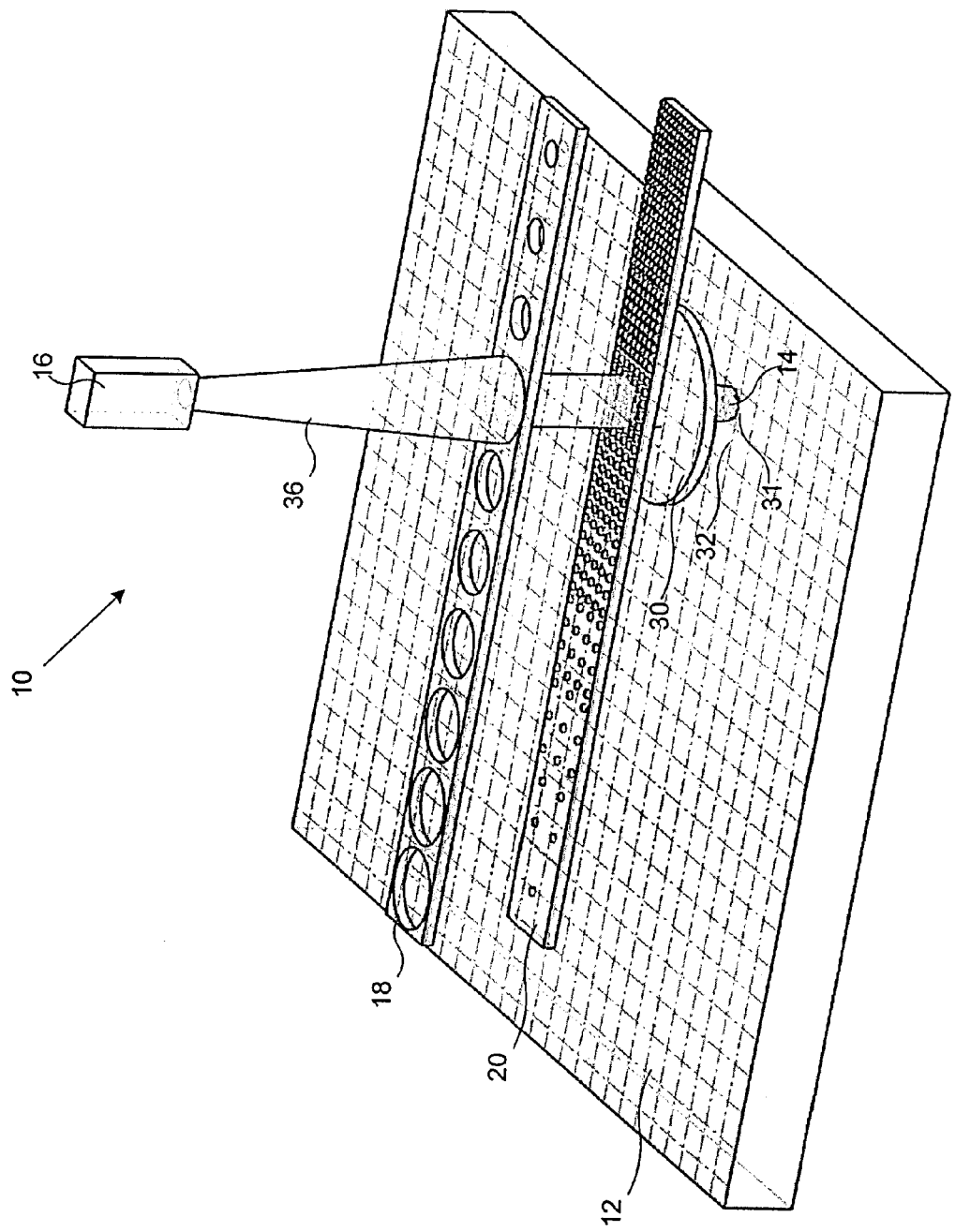
FIG. 3B is a schematic diagram showing part of the laser micromachining system shown in FIG. 3A in greater detail.

FIGS. 3A and 3B are schematic diagrams showing an example of a laser micromachining system 10 for forming optical elements 160 in a substrate 110. System 10 includes a laser light source 16, a variable aperture 18, a pattern mask set 20, a combined mask configurator 24, a positioning system 28, and a focusing element 30. As shown in FIG. 10, pattern mask set 20 is composed of pattern masks 21, each of which includes shape-defining elements 22. The combined mask configurator 24 is operable to form a combined mask 26 by juxtaposing a selected one of the pattern masks 21 with variable aperture 18. Laser light source 16 is configured to illuminate combined mask 26 with a light beam 36. Focusing element 30 is interposed between combined mask 26 and substrate 110 to form an image of the combined mask on the major surface 120 of the substrate.

An armature 38 mechanically interconnects laser light source 16, combined mask configurator 24 (including variable aperture 18 and pattern mask set 20 coupled thereto) and focusing element 30 to form an optical sub-system 39. Armature 38 is represented by a broken line to simplify the drawing. Positioning system 28 is operable to align an image 31 of combined mask 26 formed by focusing element 30 with successive averaging regions 150 of substrate 110.

In operation, light beam 36 emitted by laser light source 16 passes through combined mask 26 formed by combined mask configurator 24 aligning a selected one of the pattern masks 21 of pattern mask set 20 with variable aperture 18 set to a defined size. Referring additionally to FIG. 10, each of the pattern masks 21 in pattern mask set 20 has a respective pattern of shape-defining elements 22. The pattern masks 21 in the pattern mask set differ from one another in the density of their shape-defining elements 22. The density of the shape-defining elements 22 in a pattern mask 21 is the fraction of the area pattern mask covered by the shape-defining elements. In the example shown, the density of the shape-defining elements 22 of each of the pattern masks 21 in pattern mask set 20 differs from the densities of the pattern-defining elements of the remaining pattern masks in the pattern mask set. In the example shown in FIG. 10, shape-defining elements 22 are arranged in most of the pattern masks 21 in a regular two-dimensional array of rows and columns. Other arrangements are possible, such as a more random arrangement. Moreover, in pattern masks having relatively few shape-defining elements 22, such as pattern mask 21A, the shape-defining elements are arranged off center relative to the pattern mask to enable reducing the size of variable aperture 18 to progressively reduce the number of shape-defining elements within the aperture.

Focusing element 30 forms the demagnified image 31 of combined mask 26 (i.e., aperture 18 and pattern mask 21) in the active sub-region 152 of averaging region 150 on the major surface 120 of substrate 110. The maximum size of image 31 matches the size of averaging region 150. Image 31 defined by pattern mask 21 and variable aperture 18 is located only in the active sub-region 152 of averaging region 150. Thus, the size of variable aperture 18 defines the size of image 31 and, hence, the size of active sub-region 152. The pattern mask spatially modulates the intensity of light beam 36 incident thereon. The energy of light beam 36 in the image removes corresponding portions of the substrate to define optical elements 160 in the substrate. Specifically, the spatially-varying density of shape-defining elements 22 of selected pattern mask 21 spatially modulates the intensity of the light forming image 31 on substrate 110 within the active sub-region 152 of averaging region 150. The intensity of the light incident on each elemental area of the substrate within averaging region 150 defines the amount of material removed from the elemental area of the substrate and, hence, the depth of the corresponding elemental area of the optical element 160 that is formed.

Laser micromachining system 10 forms optical elements 160 as indentations extending into substrate 110 from the major surface 120 thereof. The optical elements are arranged within the active sub-region 152 of averaging region 150 in accordance with the arrangement of the shape-defining elements 22 in the selected pattern mask 21. Each optical element has a depth defined by the grayscale density range of the respective shape-defining element used to form the optical element and the intensity of light beam 36.

Different combinations of the selected pattern mask 21 and the size of variable aperture 18 are used to form optical elements 160 in respective averaging regions 150 of substrate 110 to form in the substrate optical elements 160 with respective average densities. The optical elements vary in average density among the averaging regions 150 in increments that are small compared with the increments in the density of shape-defining elements 22 among the pattern masks 21 in pattern mask set 20.

Once optical elements 160 have been formed in averaging region 150 of the major surface 150 of substrate 110, the positioning system 28 operates to move optical sub-system 39 and substrate 110 relative to one another to align the image 31 of combined mask 26 formed by the focusing element 30 with a new averaging region of the substrate. The new averaging region is typically in the next row or the next column to the averaging region 150 in which optical elements have just been formed, but need not be so. During operation of positioning system 28, the configuration of combined mask 26 may remain the same, or combined mask configurator 24 may operate to change the configuration of combined mask 26 before laser light source 16 operates once more to form optical elements within the active sub-region of the new averaging region. The process of positioning system 28 moving optical sub-system 39 and, hence, the image 31 of combined mask 26, and substrate 110 relative to one another, and laser light source 16 operating to form optical elements 160 within the active sub-region 152 of each new averaging region 150 continues until optical elements 160 are formed in all of the major surface 120 of the substrate, or in a portion of the major surface 120 of substrate 110 within which optical elements are to be formed.

In the example shown, laser micromachining system 10 additionally includes a base 11 to which a static portion of positioning system 28 is coupled. Armature 38 mechanically connects optical sub-system 39 composed of combined mask configurator 24 (including variable aperture 18 and pattern mask set 20 coupled thereto), laser light source 16 and focusing element 30 to a movable portion of positioning system 28. This arrangement enables positioning system 28 to move optical sub-system 39 relative to base 11.

Base 11 includes fixtures (not shown) for holding substrate 110 in a precisely defined and stable positional relationship to the base such that movement of optical sub-system 39 relative to the base can be regarded as the same movement of optical sub-system relative to substrate 110. In an example, positioning system 28 includes an X-Y stage (not shown) configured to move optical sub-system 39 in a horizontal plane in the x- and y directions shown relative to base 11. In embodiments in which substrate 110 is non-planar, positioning system 28 additionally moves optical sub-system 39 in the z-direction to maintain focusing element 30 at a precisely-defined distance from the averaging region 150 with which combined mask 26 is currently aligned. In such embodiments, positioning system 28 may additionally tilt optical sub-system 39 to maintain light beam 36 at a normal angle of incidence to averaging region 150.

In another embodiment of laser micromachining system 10 (not shown), armature 38 couples optical sub-system 39 to base 11, and positioning system 28 includes an X-Y stage (not shown) having a static portion coupled to the base. Substrate 110 is mounted on a movable portion of the X-Y stage and the X-Y stage moves the substrate relative to optical sub-system 39 to change the position of averaging region 150 on the substrate.

Substrate 110 is manufactured from any type of material (e.g., plastic, glass, metal) suitable for directly or indirectly making a light guide, a light redirecting member, and the like, or for making a tool for use in manufacturing light guides and the like. In the case that a tool is being manufactured for use in molding, embossing, or the like, a metal substrate is generally used, although a glass or plastic substrate may be used as described above to form a metal mold insert or embossing tool. A glass or plastic substrate having optical elements formed therein using laser micromachining system 10 and/or the process described herein has the advantage that the optical properties of the optical elements can be verified by testing before the substrate is used to make a tool. In the case that the system and/or process are used to form a light guide or light redirecting member directly, the material of substrate 110 is a suitable transparent glass or plastic material.

Substrate 110 constitutes part of a light guide, a light extracting member, a tool for use in a molding or embossing machine to manufacture light guides, or a tool suitable for use as a master to produce other tools for use in molding or embossing. Substrate 110 may be of a size and shape that depends on the application in which the substrate is to be used. Substrate 110 is a solid article generally made from, for example, acrylic, polycarbonate, metal, glass or another appropriate material. The substrate 110 may be shaped as a rectangle, a disk, a dome, a hollow cylinder, a hollow cone or pyramid, a hollow frustrated cone or pyramid, a hollow globe, a shape approximating the bulbous shape of a conventional incandescent light bulb, or another suitable shape. In an example in which substrate 110 is generally rectangular (e.g., the illustrated embodiments), the substrate has four side edges. Other substrate shapes result in a corresponding number of side edges. Depending on the shape of the substrate, each side edge may be straight or curved, and adjacent side edges may meet at a vertex or join in a curve.

Laser micromachining system 10 and the process described herein form optical elements 160 in the major surface 120 of substrate 110 with a size and shape defined by the shape-defining elements 22 of the selected pattern mask 21 used to form them. The average density of the optical elements in a given averaging region 150 of substrate 110 is the product of the density of the optical elements in the active sub-region 152 of the averaging region in which the optical elements are located and the area of the active sub-region expressed as a fraction of the total area of averaging region 150. The average density of the optical elements is determined by the density of shape-defining elements 22 in the selected pattern mask 21 and the size of variable aperture 18 with which the selected pattern mask is juxtaposed to form the combined mask 26 used to form the optical elements. By using different combinations of the selected pattern mask 21 and the size of variable aperture 18 in the combined mask used to form the optical elements 160 in respective averaging regions 150, the average density of the optical elements can be varied among the averaging regions in increments that are small compared to the increments in the density of the shape-defining elements among the pattern masks 21 in pattern mask set 20. Therefore, by using different combinations of the selected pattern mask and the size of the variable aperture, optical elements 160 can be formed in substrate 110 with a large number of variations in their average density using a limited amount of tooling. In an example in which pattern mask set 20 has ten (10) pattern masks 21, and variable aperture 18 has ten (10) different sizes, this combination of pattern masks and sizes of the variable aperture could yield combination masks capable of defining optical elements having up to one hundred (100) different average densities. The reduced number of distinct tools needed to make optical elements with the requisite number of different average densities leads to a reduced manufacturing time for forming optical elements 160 in substrate 110 compared to other methods. Additionally, the cost of pattern mask set 20 and the time needed to make the pattern mask set are substantially reduced, since other methods would require purchasing or manufacturing a separate pattern mask for each average density. Furthermore, since the sizes of the shape defining elements 22 of pattern masks 21 are several times (defined by the demagnification provided by focusing element 30) smaller than the optical elements themselves, manufacturing of the pattern masks is easier than if the shape-defining elements were the same size as optical elements 160 formed in the substrate.

Laser light source 16 includes an excimer or exciplex ultraviolet pulsed laser producing pulses of light having durations in the nanosecond or picosecond range. Other suitable ultraviolet, visible, or infrared lasers may be used with pulse durations ranging from picoseconds to milliseconds or longer depending on the application and substrate material. Other suitable lasers suitable for use in laser micromachining are known and may be used, including continuous-wave lasers in combination with a shutter. Although not shown, laser light source 16 can include additional optics positioned between the laser light source and combined mask 26, for example. Such additional optics can include, for example, beam shaping optics to set the shape and/or size of light beam 36 output by laser light source 16, a beam homogenizer to produce a more uniform beam profile, etc.

Referring again to FIG. 3A, laser micromachining system 10 includes a controller 60 that controls the intensity of light beam 36 generated by laser light source 16. Controller 60 may additionally or alternatively control one or more of the intensity, number and duration of pulses of the light beam generated by the laser light source to define maximum depth of optical elements 160 formed in substrate 110. Each pulse of light generated by laser light source 16 is sufficient in intensity to remove a defined amount of material from the substrate by evaporation or sublimation. The amount of material removed depends on the duration and intensity of the pulse. Controlling the intensity, the duration and the number of pulses of light precisely defines the maximum depth of the optical elements formed while preventing thermal distortion in averaging region 150.

Figure 4:
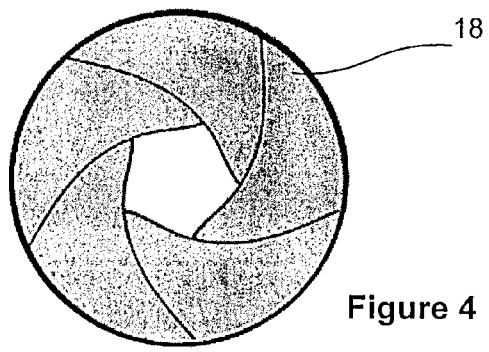
FIG. 4 is a schematic view showing an example of a variable aperture embodied as an iris.

Variable aperture 18 has an adjustable size, for example, a variable diameter. Variable aperture 18 may be adjustable continuously or in discrete increments. A variable aperture that is adjustable "continuously" may be a variable aperture that is adjustable in discrete increments that are very small, such when the variable aperture is adjusted using a stepper motor. In the example shown in FIG. 4, variable aperture 18 is embodied as an iris that is operated by a mechanism (e.g., a stepper motor or another suitable adjustment mechanism (not shown)) in response to a command supplied by controller 60 directly or via combined mask configurator 24 to define the size of the variable aperture.

Figure 5:
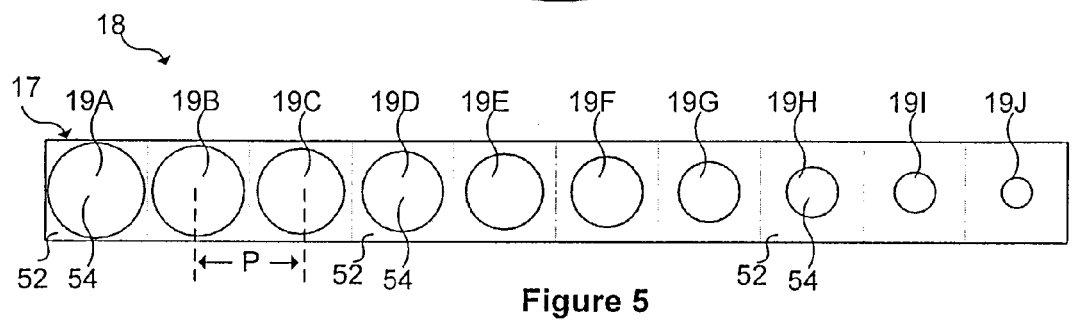
FIGS. 5-9 are schematic views showing examples of a variable aperture embodied as exemplary aperture mask sets.

FIG. 5 illustrates another embodiment of variable aperture 18 in which the variable aperture is embodied as an aperture mask set 17 composed of aperture masks 19A-19J. In this embodiment, combined mask configurator 24 operates in response to a command from controller 60 to align a selected one of the aperture masks 19 in aperture mask set 17 with the selected one of the pattern masks 21 in pattern mask set 20 and with light beam 36 to define the size of variable aperture 18. In an example, aperture mask set 17 is implemented as an opaque aperture mask substrate that defines holes of different sizes therein. Each of the holes provides a respective instance of variable aperture 18 of a different size. In another example, aperture mask set 17 is implemented as a transparent aperture mask substrate having an opaque coating. Portions of the opaque coating are removed (or rendered transparent) to define different-sized transmissive regions as respective instances of variable aperture 18. At the wavelength of the light beam 36 output by laser light source 16, each transmissive region has a transmissivity several orders of magnitude greater than that of the opaque coating such that the transmissive region defines a respective instance of variable aperture 18 of a defined size.

In some implementations in which aperture mask set 17 is embodied using an opaque coating on a transparent substrate, each of the transmissive regions defined in the opaque coating has a grayscale transition between opaque and clear. In other implementations of aperture mask set 17, the radial position of the boundary between opaque and clear varies about a mean along the boundary. In yet other implementations, the transmissivity of the transmissive region varies radially to compensate for radial non-uniformity of light beam 36.

Figure 6:
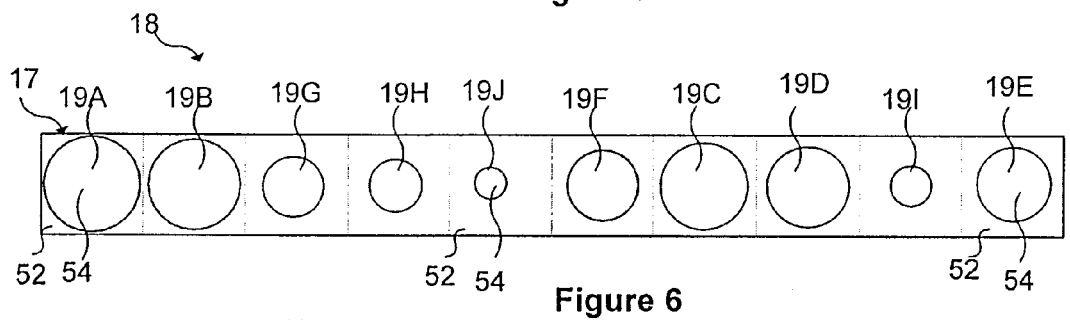

FIG. 5 shows an example of variable aperture 18 embodied as an aperture mask set 17 in which aperture masks 19 are arranged in a prescribed order, e.g., in order of their size. FIG. 6 shows another example of variable aperture 18 embodied as an aperture mask set 17 in which aperture masks 19 of commonly-used sizes are located adjacent one another. Such an arrangement of the aperture masks requires less movement of aperture mask set 17 to change the size of variable aperture 18 when laser micromachining system 10 is operated to form optical elements 160 in substrate 110.

The example of variable aperture 18 shown in FIG. 5 is embodied as an aperture mask set 17 composed of aperture masks 19A-19J in which each aperture mask 19 has an opaque region 52 and a transmissive region 54, as described above. The size of transmissive region 54 differs among the aperture masks in the aperture mask set.

Figure 7:
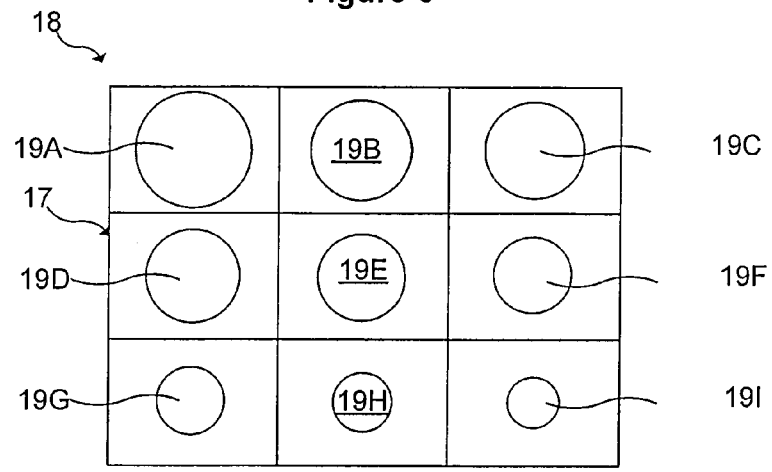
Figure 8:
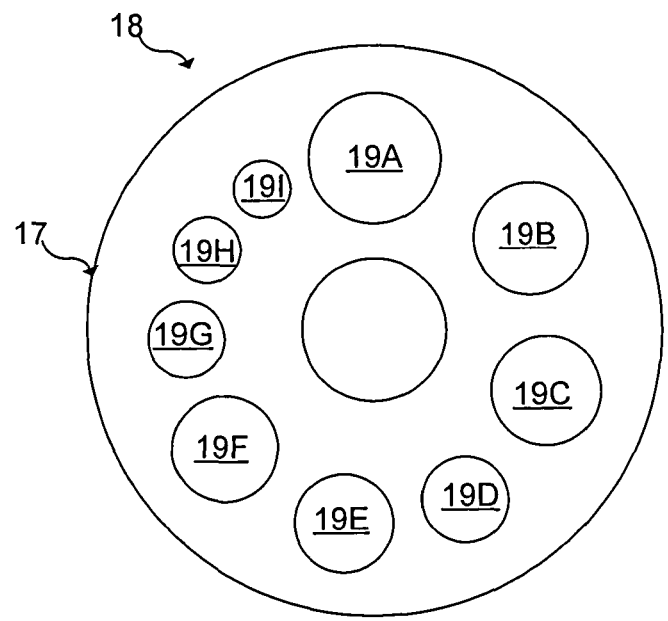
Figure 9:
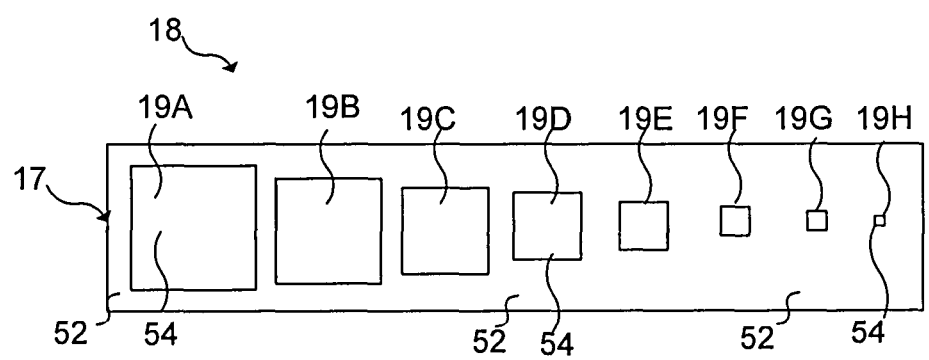

In the example shown in FIG. 5, the aperture masks 19A-19J of aperture mask set 17 are arranged in a one-dimensional array. FIG. 7 shows an example in which the aperture masks 19A-19I of aperture mask set 17 are arranged in a two-dimensional array. FIG. 8 shows an example in which the aperture masks 19A-19I of aperture mask set 17 are arranged in a circular array. FIG. 9 shows an example in which the shape of the transmissive region 54 of each aperture mask 19A-19H of aperture mask set 17 is an equilateral polygon, i.e., a square in the example shown, but the aperture could be shaped as a hexagon, an octagon, etc. In each of the examples described above with reference to FIGS. 5-9, adjacent aperture masks 19 are spaced apart by a pitch P (FIG. 5) sufficient that the light beam 36 from laser light source 16 passes through the transmissive region 54 of only one of the aperture masks at a time. Moreover, each of the examples of variable aperture 18 described above with reference to FIGS. 4-9 is configured such that, at its largest setting, its transmissive region 54 has a diameter or diagonal dimension smaller than the diameter the light beam 36. This is to ensure that the size of variable aperture 18 defines the size of the light beam 36 imaged on the substrate and, hence, the size of the active sub-region 152 of averaging region 150.

The examples of variable aperture 18 described above with reference to FIGS. 4-9 are merely examples, and other arrangements, configurations and/or sizes of variable aperture 18 are possible and may be used.

FIG. 10 shows an example of a pattern mask set 20 composed of pattern masks 21. In the example shown, pattern mask set 20 is composed of pattern masks 21A-21J.

Other examples of pattern mask sets have more or fewer pattern masks 21. Each of the pattern masks 21A-21J includes an arrangement of two-dimensional shape-defining elements 22. To simplify the drawing, only the perimeters of the shape-defining elements are shown in FIG. 10. In the example shown in FIG. 10, shape-defining elements 22 each have a circular perimeter. In other examples (not shown), shape-defining elements 22 each have a perimeter defined by two intersecting arcs. In an example, the arcs intersect at the axis of symmetry of the shape-defining element. Such a configuration of shape-defining elements 22 is for defining optical elements similar to the optical elements shown in FIG. 5b of U.S. Pat. No. 6,752,505.

Referring additionally to FIG. 3A, in one example of shape-defining elements 22, each of the shape-defining elements is a two-dimensional grayscale pattern in which the shape and dimensions of the grayscale pattern define the shape and dimensions of the corresponding optical element 160 in the x-y plane, parallel to the major surface 120 of substrate 110, and variations in the density of the grayscale pattern in the x-y plane define corresponding spatial variations in the depth of the optical element in the z-direction, orthogonal to the major surface of the substrate. The grayscale may be a continuous grayscale or a grayscale in which there are small, discrete density increments between adjacent grayscale densities. Such a grayscale may be provided by a variable-thickness layer of absorbing or reflecting material. The grayscale may alternatively be realized using a half-toning technique (highly opaque elemental regions alternating with highly transmissive elemental regions, where the ratio between the area of the transmissive elemental regions and the area of the opaque elemental regions defines the density of the grayscale) as long as focusing element 30 cannot resolve the elemental areas. Half-toning patterns can be defined by single-bit (opaque/clear) or multi-bit (density) values.

A shape-defining element 22 spatially modulates the intensity of a portion of light beam 36 incident on an area of substrate 110 in which a corresponding three-dimensional optical element 160 is to be formed. The spatial modulation of the intensity of the light beam within this area defines the three-dimensional geometry of the optical element. A shape-defining element 22 may be configured to define such three-dimensional optical elements as a conical optical element, a frustoconical optical element, a V-groove optical element, a lenticular groove optical element, or any other three-dimensional optical element shape, including those described in U.S. Pat. No. 6,752,505. Shape-defining elements 22 may also be configured to define three-dimensional optical elements that are substantially uniform in depth over at least part of the major surface 120 of substrate 110 or that have a depth that varies with position on the major surface of substrate 110, depending on the intended application. The shape-defining elements 22 of each pattern mask 21 in pattern mask set 20 typically have the same size, shape and grayscale pattern. Moreover, the shape-defining elements 22 of all the pattern masks 21A-21J of pattern mask set 20 typically have the same size, shape and grayscale pattern. However, in some embodiments, one or more of the size, shape and grayscale pattern of the shape-defining elements 22 differ among, or even within, the pattern masks 21A-21J of pattern mask set 20.

As noted above, two-dimensional shape-defining elements 22 are used to form three-dimensional optical elements 160 in substrate 110. Within pattern mask set 20, pattern masks 21A-21J differ from one another in the density of their respective shape-defining elements 22 by first density increments. The density of the shape defining elements 22 is the fraction of the area the pattern mask 21 covered by shape-defining elements 22. Since the pattern masks typically all have the same area and the shape-defining elements are typically the same, the number of the shape-defining elements in each pattern mask 21 can usually provide a measure of the density of the shape-defining elements in the pattern mask. As used in this disclosure, the phrase first density increments means the difference in the density of the shape defining elements between a given pattern mask 21A-21J and another pattern mask in pattern mask set 20 having the next higher or next lower density of shape-defining elements.

In the example shown in FIG. 10, pattern mask 21A has two shape-defining elements 22 within pattern mask 21A and therefore has a density equal to 2 times the area of each shape-defining element divided by the area of each pattern mask 21 Pattern mask 21B has four shape-defining elements 22 arranged in a 2×2 array. Pattern mask 21B therefore has a density equal to 4 times the area of each shape-defining element divided by the area of each pattern mask 21 and the density increment between pattern masks 21A and 21B is equal to 2 times the area of each shape-defining element divided by the area of each pattern mask 21. Pattern masks 21C-21I have progressively-increasing numbers of shape-defining elements 22 arranged in respective square arrays within the pattern mask, and progressively increasing densities. Finally, pattern mask 21J has one-hundred shape-defining elements 22 arranged in a 10×10 array within the unit area, and therefore has a density equal to 100 times the area of each shape-defining element divided by the area of each pattern mask 21.

The example of pattern mask set 20, and the example of shape-defining element 22 described above with reference to FIG. 10 are merely examples, and other arrangements, configurations and/or sizes of pattern mask sets 20, pattern masks 21 and/or shape-defining elements 22 are possible and may be used. For example, in addition to the one-dimensional array shown in FIG. 10, the pattern masks 21 of pattern mask set 20 can be arranged in a two-dimensional array similar to that of the example of aperture mask set 17 shown in FIG. 7, or in a circular array similar to that of the example of aperture mask set 17 shown in FIG. 8. Frequently-used pattern masks 21 can be located adjacent one another in a manner similar to that of the example of aperture mask set 17 shown in FIG. 6. Other arrangements of the pattern masks 21 of pattern mask set 20 are possible and may be used.

FIGS. 11A and 11B are schematic views showing two examples of an individual shape-defining element 22 configured to define a frustoconical optical element 160 in the active sub-region 152 of the averaging regions 150 of substrate 110. In the example shown in FIG. 11A, shape-defining element 22 is defined by a multi-bit digital grayscale. Annular regions of progressively increasing grayscale densities are arranged concentrically with a central circular region of minimum grayscale density. The number of increments of grayscale may be greater than or less than the number illustrated. Increasing the number of increments of grayscale density between a minimum density and a maximum density (e.g., increasing from a 4-bit grayscale (16 grayscale densities) to an 8-bit grayscale (256 grayscale densities) provides a progressively closer approximation to a substantially continuous variation in grayscale density. This reduces stair step features on the sloped surface of the corresponding optical element.

The regions of increasing grayscale density differently attenuate the intensity of light beam 36 such that, after attenuation by shape-defining element 22, light beam 36 removes progressively less material from substrate 110 as the distance from the center of the optical element increases to form the above-mentioned conical optical element. The number of grayscale densities may be greater than or less than that illustrated.

In the example shown in FIG. 11B, shape-defining element 22 is defined by an analog grayscale. The density of the grayscale increases continuously with increasing radial distance from the center of the shape-defining element. A digital grayscale having a large number of discrete grayscale densities closely approximates the analog grayscale shown.

In an example, a grayscale pattern mask set is made using a transparent pattern mask substrate, such as glass cover plate, covered by an opaque, easily etched metal layer. Chromium is often used as the material of the metal layer because, among other reasons, chromium is easily deposited by evaporation or sputtering, and is easily selectively etched using conventional photoresists and commercially-available etchants that are etch-compatible with glass and other materials used for the pattern mask substrate. A grayscale with multiple densities can be created using a half-toning technique. In this, the metal layer is etched to form an array of small light-transmissive holes of different sizes in the metal layer. The size of the holes in a given region of the mask defines the inverse of the local grayscale density within the region. Alternatively, the metal layer may be etched to remove the entire metal layer except for an array of different-sized dots. The size of the dots in a given region of the mask defines the local grayscale density within the region.

Referring again to FIG. 3A, combined mask configurator 24 is configured to receive pattern mask set 20 of pattern masks 21 in which shape-defining elements 22 are configured to define optical elements 160 of a defined shape. In some instances, several pattern mask substrates are needed to accommodate the complete pattern mask set 20. The combined mask configurator 24 is operable to juxtapose one of the pattern masks 21 selected from pattern mask set 20 with variable aperture 18 and to define the size of variable aperture 18 (which may be done by selecting one aperture mask 19 from an aperture mask set 17 also received by combined mask configurator 24) to form combined mask 26. Light beam 36 generated by laser light source 16 passes through combined mask 26, i.e., through variable aperture 18 and through the selected one of pattern masks 21. The size of variable aperture 18 limits the size of light beam 36 to define the size of the active sub-region 152 of averaging region 150, and the selected pattern mask 21 spatially modulates the intensity of light beam 36 to form the optical elements. The light from the combined mask is focused by focusing element 30 to form an image 31 of the combined mask in the averaging region 150 of the major surface 120 of substrate 110. The focused, spatially-modulated light beam selectively removes material from substrate 110 within the active sub-region 152 of averaging region 150 to form a corresponding pattern of optical elements 160 in the averaging region. Juxtaposing one of the pattern masks 21 selected from pattern mask set 20 with variable aperture 18 of a defined size allows the total number of different pattern masks 21 in pattern mask set 20 to be substantially smaller than the number of variations in the average density of the optical elements formed in respective averaging regions 150 of substrate 110.

Figure 12A:
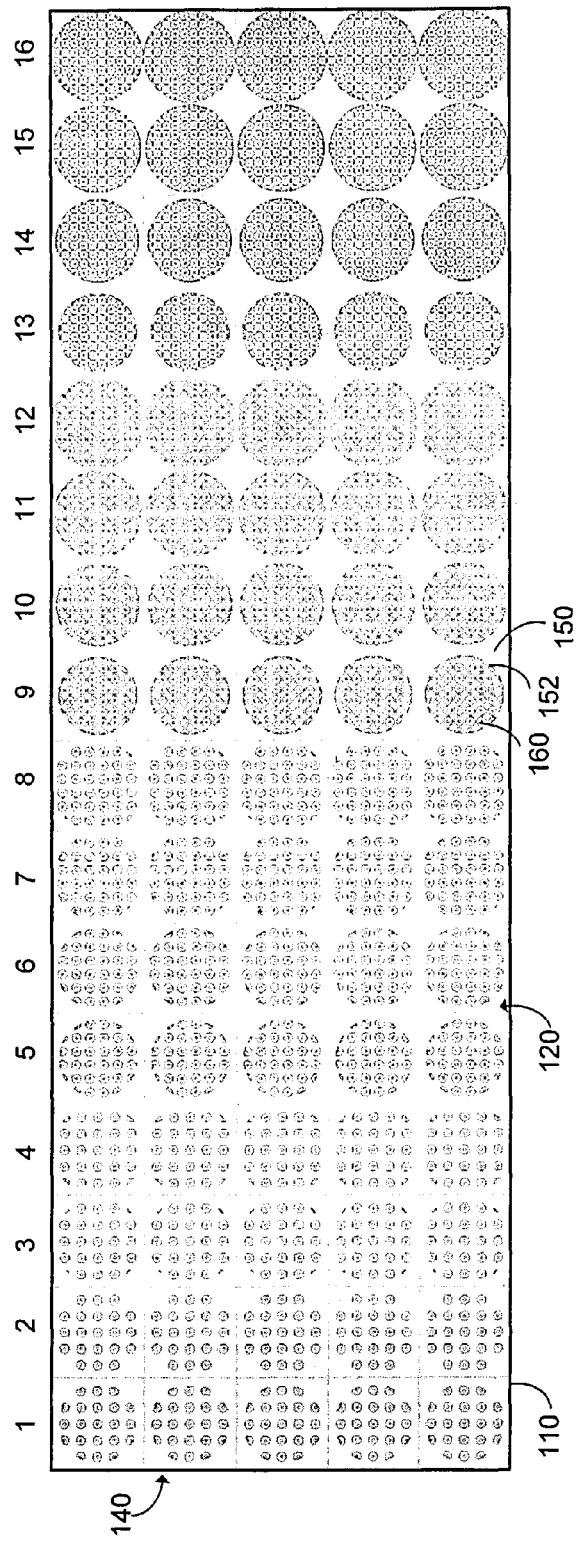
FIG. 12A is a schematic view showing an example of substrate having optical elements formed therein using different sizes of a variable aperture and pattern masks having different densities of shape-defining elements.

FIG. 12A is a schematic drawing showing a highly-simplified example of substrate 110 in which optical elements 160 are formed as described above and illustrates how the optical elements can be formed in respective averaging regions 150 of substrate 110 with a large number of different average densities using a substantially smaller number of different pattern masks 21 and variable aperture 18. In the example shown, substrate 110 constitutes part of a light guide configured to be edge lit at its light input edge 140, and the optical elements 160 formed therein are light-extracting optical elements. The light extracting elements are configured to extract light propagating along the light guide from the light input edge 140 through one of the major surfaces 120 of the light guide with a nominally-constant intensity profile (variation of intensity with position on major surface 120). In other examples, the optical elements are configured to extract light with defined, non-uniform intensity profiles, or to redirect light with a defined light ray angle distribution.

To extract light from substrate 110 with a nominally-uniform intensity profile, the optical elements 160 formed in the major surface 120 of the substrate or in the major surface opposite major surface 120 have a progressively-increasing light-extracting power with increasing distance from light input edge 140. The increasing light extracting power of the optical elements is obtained by increasing the density of the optical elements with increasing distanced from light input edge 140. Moreover, the optical elements 160 are configured to extract the light with a precisely-defined light ray angle distribution.

Conventionally, light guides such as the light guide just described are difficult to make for a variety of reasons, For example: conventional mechanical machining techniques typically form each light-extracting optical element individually, and so require several weeks to generate the mold to make a large-screen TV-sized version of such a light guide. Conventional laser machining techniques form multiple, larger light-extracting optical elements at a time but require thousands of different masks to provide the needed fine increments in the density of the optical elements. The time required to interchange so many masks on the laser micromachining apparatus again results in several weeks being needed to produce the mold. Conventional chemical etch techniques are faster, but do not form optical elements that extract light with precisely-defined light ray angle distributions. Conventional density patterning techniques result in low optical element densities in which the individual light-extracting optical elements are so large that they can be visible in television-sized light guides.

As noted above, the substrate 110 is divided into a two-dimensional array of averaging regions 150. In the example of substrate 110 shown in FIG. 12A, the number of averaging regions 150 is substantially less than that of a practical example, and increments in the size of the active sub-region 152 of averaging regions 150 (and hence, the increments in the size of the variable aperture used to define the size of the active sub-region) and the increments in the density of the optical elements in the active sub-regions of the averaging regions (and, hence, the increments in the densities of the shape-defining elements used to define the optical elements) between adjacent columns of the averaging regions is greatly exaggerated for the purpose of illustration. In an actual substrate, the difference between adjacent columns would typically be indiscernible to the naked eye. Such small increments in the active sub-region size and optical element density provide smaller increments in the average density of the optical elements that enables the optical elements to extract light from the light guide with a nominally-uniform intensity profile devoid of discernable intensity steps. The pitch of averaging regions 150 is sufficiently small that adjacent passive sub-regions and active sub-regions cannot be resolved from one another by the naked eye at a typical viewing distance in the application in which the light guide is used. Unless a diffuser film is used, a light guide used to back light a liquid crystal display (LCD) is typically more critical in this respect than a light guide for use in a lighting fixture.

Figure 12C:
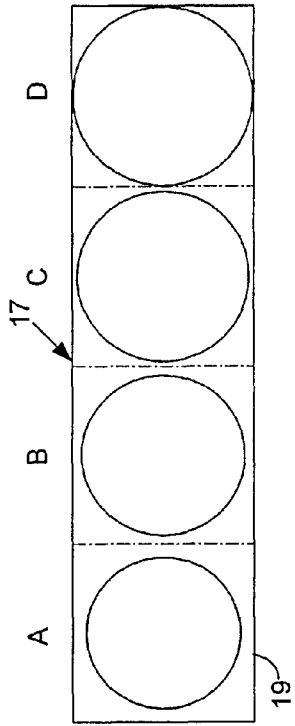
FIGS. 12B and 12C are schematic views showing examples of the pattern mask set and the aperture mask set, respectively, used to make the substrate of FIG. 12A.
Figure 12B:
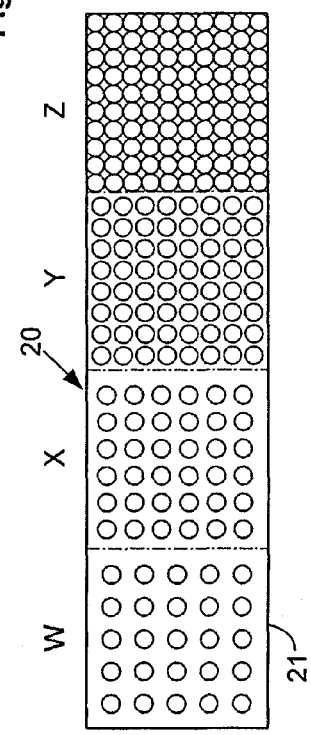

As noted above, the average density of the optical elements in each averaging region is the product of the density of the optical elements in the active sub-region of the averaging region and the fraction of the area of the averaging region occupied by the active sub-region. In the example shown, the average density of optical elements 160 in each averaging region 150 of substrate 110 is defined by the product of the density of the shape-defining elements 22 in pattern mask 21 used to define the optical elements and the size of variable aperture 18 used define the size of active sub-region 152 and, hence, the fraction of the area of averaging region 150 occupied by the active sub-region. The example of substrate 110 shown in FIG. 12A has 16 columns (numbered 1-16 in FIG. 12A and in Table 1 below) of light-extracting optical elements 160 having progressively higher average densities with increasing distance from light input edge 140. This example of substrate 110 can be fabricated using only four different sizes of the variable aperture 18 (shown in FIG. 12C and labeled A, B, C, D in FIG. 12C and Table 1 in order of increasing size) and four different pattern masks (shown in FIG. 12B and labeled W, X, Y, Z in FIG. 12B and Table 1 in order of increasing density of shape-defining elements). The sizes of variable aperture 18 and the densities of the shape-defining elements 22 of pattern masks 21 are chosen such that all combinations of the sizes of the variable aperture and densities of the shape-defining elements of the pattern masks produce a respective unique average density of the optical elements formed. Alternatively, a larger number of either or both of the sizes of the variable aperture and the densities of the shape-defining elements of the pattern masks may be used to provide the required number of different average densities in which more than one combination of the variable aperture size and the shape-defining element density produce the same average density of the optical elements formed. Using different combinations of the variable aperture size and the shape-defining element density to form the same average density of the optical elements in adjacent averaging regions helps eliminate patterning and moiré effects.

Referring to FIG. 12A and Table 1 below, in column 16, remote from light input edge 140, a high average density of optical elements 160 is needed. Consequently, optical elements 160 within the averaging regions 150 in column 16 are formed using the pattern mask Z having the highest density of shape-defining elements and the largest size D of variable aperture 18. In columns 15, 14 and 13, progressively slightly smaller average densities of optical elements 160 are obtained by forming the light-extracting optical elements within the averaging regions in such columns using the highest-density pattern mask Z and progressively smaller sizes C, B, A of variable aperture 18.

The progressively smaller average density of the optical elements 160 in column 12 is obtained by returning variable aperture 18 to its largest size D and changing the selected pattern mask to the second-highest density pattern mask Y. In columns 11, 10 and 9, progressively slightly smaller average densities of optical elements 160 are obtained by forming optical elements 160 within averaging regions 150 in columns 11-9 using the second-highest density pattern mask Y and progressively smaller sizes C, B, A of variable aperture 18.

The combinations of the density of the shape-defining elements in the respective pattern masks and the variable aperture size for all the columns shown in FIG. 12A are shown in Table 1. In applications that require a large variation between the highest average density and the lowest average density, the ratio between the largest aperture size and the smallest aperture size is greater than the ratio between adjacent pattern mask densities. In this case, the pattern mask has to be changed in more instances than in the example shown in Table 1.

TABLE 1

| Column | Variable Aperture Size | Density of Shape-Defining Elements in Pattern Mask |
|---|---|---|
| 1 | A | W |
| 2 | B | W |
| 3 | C | W |
| 4 | D | W |
| 5 | A | X |
| 6 | B | X |
| 7 | C | X |
| 8 | D | X |
| 9 | A | Y |
| 10 | B | Y |
| 11 | C | Y |
| 12 | D | Y |
| 13 | A | Z |
| 14 | B | Z |
| 15 | C | Z |
| 16 | D | Z |

As noted above, each averaging region 150 is composed of an active sub-region 152 and a passive sub-region 154. The optical elements 160 are located only in active sub-region 152. The optical elements 160 within the active sub-region 152 have a density (referred to as a first density) defined by the density of shape-defining elements 22 in the pattern mask 21 used to form the optical elements in the averaging region. Passive sub-region 154 is devoid of optical elements. Consequently, the optical elements 160 in averaging region 150 have an average density given by the product of the first density and the fraction of the area of the averaging region occupied by active sub-region 152. The size of active sub-region 152, and, hence, the fraction of the area of averaging region 150 occupied by the active sub-region, is defined by the size of variable aperture 18. At least one of the area of active sub-region 152 and the first density varies among averaging regions 150 such that the average density of the optical elements in each averaging region differs among the averaging regions by increments that are small compared to increments in the first densities.

In the example shown in FIG. 12A, all averaging regions 150 in each column are shown as having the same average density of optical elements 160 to simplify the drawing. More typically, the variation in the average density of the optical elements is a two-dimensional variation, i.e., the average density varies along the columns in addition to varying between the columns as illustrated.

Combined mask configurator 24 is configured to align a selected one of the pattern masks 21 in pattern mask set 20 with variable aperture 18 to form combined mask 26. The implementation of the combined mask configurator 24 depends on the configuration of variable aperture 18 and/or the configuration of pattern mask set 20. In an example in which pattern mask set 20 is configured as a one-dimensional array of pattern masks 21 and variable aperture 18 is embodied as aperture mask set 17 in which aperture masks 19 are arranged in a one-dimensional array, combined mask configurator 24 is configured to translate one or both of aperture mask set 17 and pattern mask set 20 relative to the other in one dimension to juxtapose a selected one of the aperture masks 19 and a selected one of the pattern masks 21 to form the desired combined mask 26 in alignment with light beam 36. In an example in which variable aperture 18 is embodied as an aperture mask set 17 in which aperture masks 19 are arranged in a circular array and pattern mask set 20 is configured as a circular array of pattern masks 21, combined mask configurator 24 has a stepper motor (or other suitable motor(s)) that rotates each of aperture mask set 17 and pattern mask set 20 to juxtapose a selected one of the aperture masks 19 and a selected one of the pattern masks 21 to form the desired combined mask 26 in alignment with light beam 36.

Combined mask configurator 24 may be manually controlled but is more typically automatically controlled. Combined mask configurator 24 typically includes a suitable mechanism to define the size of variable aperture 18 and to move pattern mask set 20 relative to the variable aperture to form combined mask 26 in alignment with light beam 36. Mechanisms for moving substantially planar objects relative to one another at high speed and with high positioning precision are known in the art and may be used in combined mask configurator 24.

In some embodiments, variable aperture 18 (embodied as an iris, an aperture mask set or another suitable form) and pattern mask set 20 are integral parts of combined mask configurator 24 and the combined mask configurator includes an actuator (not shown) that moves the pattern mask set to align a selected one of the pattern masks 21 of the pattern mask set with variable aperture 18. In some examples, the combined mask configurator additionally includes an actuator (not shown) that controls the size of the variable aperture, e.g., by controlling the size of an iris or by moving an aperture mask to align a selected one of the aperture masks in the aperture mask set with the light beam 36 output by laser light source 16. Alternatively, the actuator that controls the size of the variable aperture is part of the variable aperture. In other embodiments, variable aperture 18 (embodied as an iris, an aperture mask set or another suitable form) is an integral part of combined mask configurator 24, as just described, and the combined mask configurator is additionally configured to receive one or more pattern mask sets 20 and to move a selected pattern mask 21 of the pattern mask set into alignment with variable aperture 18 and light beam 36 output by laser light source 16. In an example, the combined mask configurator is configured to receive one or more one pattern mask sets 20 in a fixture that is moved by an actuator (not shown) that constitutes part of the combined mask configurator to align a selected one of the pattern masks 21 of the pattern mask set with variable aperture 18. In another example, the actuator drives the pattern mask set directly to align a selected one of the pattern masks of the pattern mask set with the variable aperture. In other embodiments, neither variable aperture 18 nor pattern mask set 20 is an integral part of combined mask configurator 24. In such embodiments, combined mask configurator 24 is configured to receive variable aperture 18 (embodied as an iris, an aperture mask set or another suitable form) in alignment with light beam 36 and to control the size of the variable aperture. In some examples, combined mask configurator 24 controls the size of variable aperture 18 mechanically by, for example, coupling the output of an actuator (not shown) that constitutes part of the combined mask configurator to control the size of the variable aperture. In other examples, combined mask configurator 24 controls the size of variable aperture 18 electrically by, for example, providing control signals to an actuator (not shown) that constitutes part of the variable aperture. Additionally, combined mask configurator 24, is configured to receive at least one pattern mask set 20 and includes an actuator (not shown) to move the pattern mask set to align a selected one of the pattern masks 21 of the pattern mask set with variable aperture 18, as described above. In another example, the actuator drives the pattern mask set directly, also as described above.

In the example shown, controller 60 (FIG. 3A) is operatively coupled to combined mask configurator 24 to control operation of the combined mask configurator 24. Controller 60 is configured to receive instructions that define the size of averaging regions 150 and specify the average density of the optical elements to be formed in each of the averaging regions. In response to such instructions, for each averaging region 150, the controller identifies the pattern mask 21 to be juxtaposed with variable aperture 18 and determines the size of the variable aperture that collectively provide the specified average density of optical elements in the averaging region. The controller then provides corresponding commands to the combined mask configurator 24 that cause the combined mask configurator to configure combined mask 26 accordingly. Alternatively, the controller forwards the average density specification to combined mask configurator 24 and, in response, the combined mask configurator identifies pattern mask 21 and determines the size of variable aperture 18. Alternatively, the instructions may define the size of the variable aperture and the identity of the pattern mask for each averaging region, in which case, the controller simply forwards the instructions for the averaging region aligned with combined mask 26 to combined mask configurator 24. Additionally, the controller provides commands to positioning system 28 that cause the positioning system to align the designated averaging region 150 with combined mask 26.

In some examples, the controller 60 performs (e.g., carries out) logical operations, typically in response to instructions (e.g., by executing executable code) that is stored on a non-transitory computer-readable medium (e.g., a magnetic, optical or electronic memory). In the illustrated embodiment, the controller 60 is a microcontroller and, in other embodiments, the controller 60 is a general-purpose processor, or an application specific integrated circuit (ASIC), for example. Alternatively, all of part of controller 60 may be implemented in hardware or all or part of controller 60 may be implemented externally to system 10.

In an example, combined mask configurator 24 is configured to maximize the size of the active sub-region 152 of each averaging region 150, and to minimize the size of the passive sub-region 154 from which no light is extracted. In this example, combined mask configurator 24 operates in response to controller 60 to select one of the pattern masks 21 in which shape-defining elements 22 have a density that, when the pattern mask is juxtaposed with variable aperture 18 set to its largest size, would form optical elements 160 with an average density as close as possible to, but more than, the average density specified for the averaging region 150 aligned with combined mask 26. The combined mask configurator 24 then operates in response to controller 60 to reduce the size of variable aperture 18 until the difference between the resulting average density of optical elements and the specified average density is minimized. In the event that the difference is unacceptably large, a different combination of pattern mask and variable aperture size is used. The different combination is one that provides an acceptably small difference between the average density that would be produced and the specified average density.

The number of combined masks 26 that can be formed using a given variable aperture 18 and a given pattern mask set 20 is determined by the product of the number of possible sizes of variable aperture 18 and the number of pattern masks 21 in pattern mask set 20. In the example shown in Table 1, variable aperture 18 has four possible sizes (A-D) and pattern mask set 20 has pattern masks 21 with four different densities (W-Z) of shape-defining elements 22. Based on the number of sizes of the variable aperture 18 and the number of pattern masks 21 in the pattern mask set 20, combined mask 26 has sixteen possible average densities of optical elements. This number assumes that all possible combinations of variable aperture size and pattern mask produce a unique average density of optical elements. Thus, as stated above, by juxtaposing different pattern masks 21 with different sizes of variable aperture 18, a large number of variations in the average density of the optical elements can be made using a substantially smaller number of different pattern masks 21. That is, the number of different pattern masks 21 in pattern mask set 20 is substantially less than the number of variations in the density of the optical elements that can be formed in the substrate 110 using the pattern masks in the pattern mask set in combination with variable aperture 18.

Positioning system 28 is configured to align optical sub-system 39, including combined mask 26, with each averaging region 150 of substrate 110. In an embodiment, positioning system 28 is for positioning an averaging region 150 of substrate 110 and optical sub-system 39, including combined mask 26, in alignment with one another. In such embodiment, adjacent averaging regions 150 are offset from one another by an averaging region pitch and the maximum size of the image 31 of combined mask 26 formed by focusing element 30 is less than or equal to the averaging region pitch. In general, positioning system 28 has a positioning tolerance, and the difference between the averaging region pitch and the maximum size of the variable aperture 18 is greater than this tolerance.

In some embodiments of laser micromachining system 10, positioning system 28 includes an X-Y stage (not shown) that supports substrate 110. Positioning system 28 operates in response to command signals from controller 60 that define the position to which positioning system 28 is to move the X-Y stage, and, hence, the position of the averaging region 150 on the substrate aligned with combined mask 26. In other embodiments of laser micromachining system 10, the substrate is fixed to base 11, and positioning system 28 includes an X-Y stage (not shown) configured to move optical sub-system 39 relative to base 11, and, hence, relative to substrate 110. Positioning system 28 operates in response to command signals from controller 60 that define the position to which the positioning system is to move the optical sub-system, and, hence, the position of the averaging region on the substrate aligned with the combined mask.

In the example shown in FIG. 3A, a single controller 60 controls laser light source 16, combined mask configurator 24 and positioning system 28. In an example, the controller receives, for each averaging region, an input that specifies the average density of optical elements 160 to be formed in the averaging region and the position of the averaging region on the major surface 120 of substrate 110. In response to the input, the controller 60 controls combined mask configurator 24 to move a selected pattern mask 21 of pattern mask set 20 into alignment with variable aperture 18 and to set the size of the variable aperture. Controller 60 also controls positioning system 28 to move optical sub-system 39 to a position at which the image 31 of combined mask 26 is aligned with the specified position of the averaging region 150 on the major surface 120 of substrate 110. Once the moving parts are appropriately aligned, controller 60 controls laser light source 16 to generate a defined number of pulses of light having a defined duration and a defined intensity to form optical elements 160 in the averaging region of the substrate. In other examples (not shown) of laser micromachining system 10, individual controllers control laser light source 16, combined mask configurator 24 and positioning system 28, respectively, or more than one of laser light source 16, combined mask configurator 24 and positioning system 28.

Referring again to FIGS. 3A and 3B, focusing element 30 is located between combined mask 26 and substrate 110. The focusing element forms an image 31 of combined mask 26 on the major surface 120 of substrate 110. Image 31 is smaller by a demagnification ratio than combined mask 26 itself. Hence, optical elements 160 formed in substrate 110 are smaller by the demagnification ratio than the corresponding shape-defining elements 22 of the selected pattern mask 21. In an example, the demagnification ratio is 5:1, so that the linear dimensions of optical elements 160 are one-fifth of those of the shape-defining elements of the pattern mask. This enables the shape-defining elements to be relatively large, which makes the shape-defining elements easier and less expensive to make, and less vulnerable to dust during use. Other demagnification ratios are possible and may be used.

In operation, substrate 110 or optical sub-system 39 are moved as just described to align an averaging region 150 on substrate 110 with combined mask 26, one of the pattern masks 21 of pattern mask set 20 is selected and aligned with variable aperture 18 and the size of the variable aperture is selected, and laser light source 16 is operated to form optical elements 160 in the averaging region. This process is repeated until optical elements have been formed in all averaging regions 150 of substrate 110, or in a defined portion thereof. Different combinations of pattern mask 21 and size of variable aperture 18 are used in alignment with different averaging regions 150 to vary the average density of optical elements over the major surface 120 of substrate 110.

Figure 13:
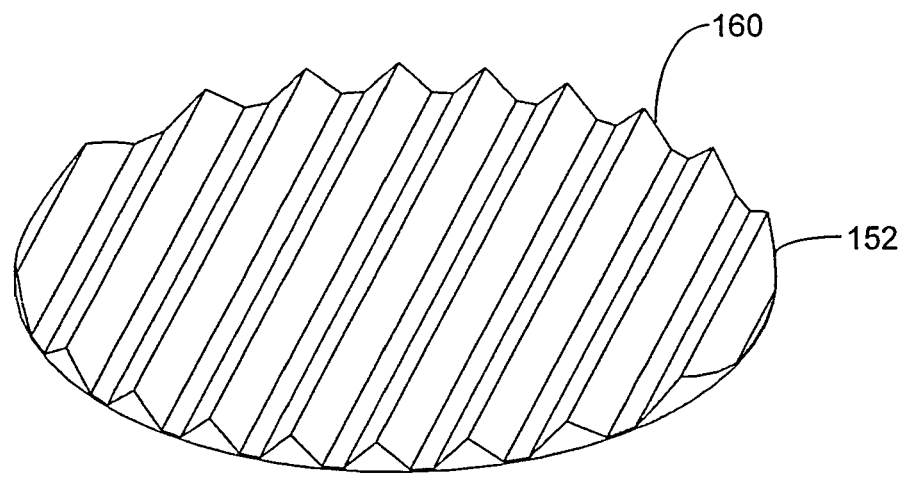
FIGS. 13 and 14 are schematic views showing exemplary optical elements formed in the active sub-region of an averaging region of a substrate.
Figure 14:
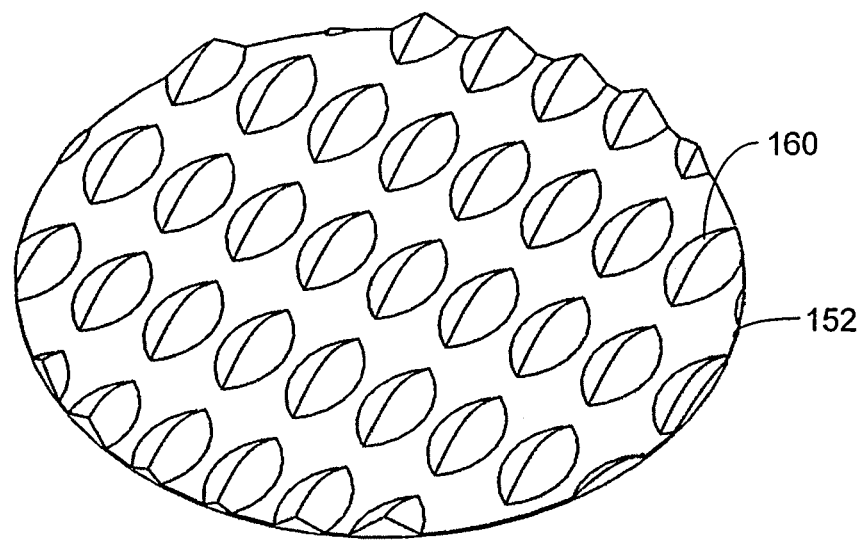

Exemplary optical elements 160 include features of well-defined shape, such as V-grooves, lenticular grooves, and features of well-defined shape that are small relative to the linear dimensions of the major surfaces of substrate 110. FIG. 13 shows an example of optical elements 160 in the shape of V-grooves formed in the active sub-region 152 of an averaging region of the substrate. FIG. 14 shows an example of optical elements 160 having two curved surfaces that intersect to form a ridge formed in the above-mentioned active sub-region. The examples of optical deformities shown in FIGS. 13 and 14 protrude from the major surface of the substrate, and have therefore been made using a tool made directly or indirectly by laser micromachining system 10 and/or the process described herein.

Figure 15:
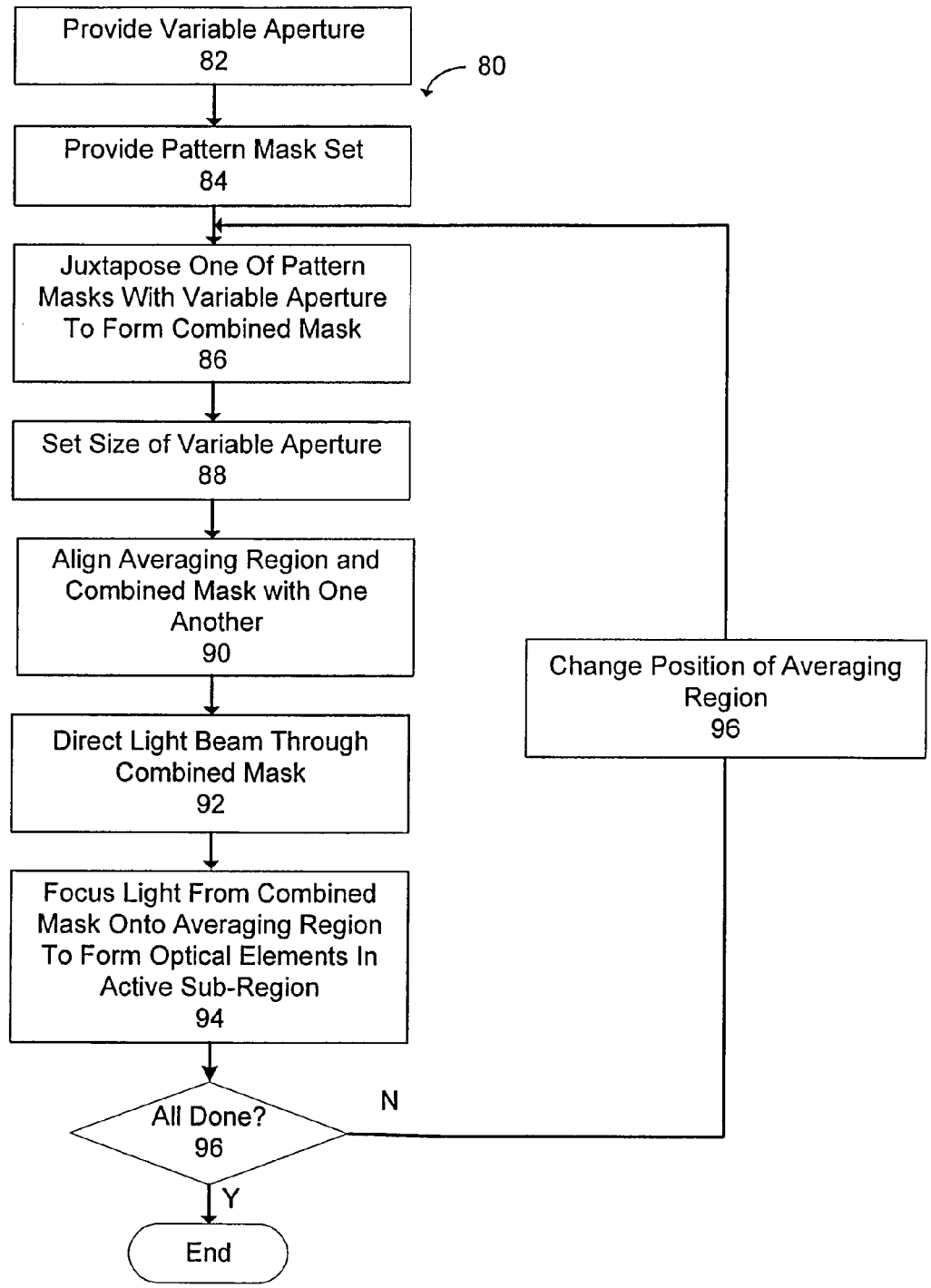
FIG. 15 is a flow chart showing an exemplary method for laser micromachining optical elements in a substrate.

FIG. 15 is a flow chart showing an example of a process 80 for forming optical elements 160 in a substrate 110. The order of at least some of the operations of process 80 is exemplary, and some of the operations of process 80 can be performed in an order different from that shown, or even concurrently. In block 82, a variable aperture 18 is provided.

Variable aperture 18 is variable in the sense that its size is variable, for example, the diameter of the aperture. The size of variable aperture 18 may be variable continuously or in discrete increments.

In block 84, a pattern mask set 20 composed of pattern masks 21 is provided. Each of the pattern masks 21 in the pattern mask set includes shape-defining elements 22. The pattern masks in the pattern mask set differ from one another in the density of their shape-defining elements by first density increments.

In block 86, one of the pattern masks 21 is juxtaposed with the variable aperture to form a combined mask 26 for forming the optical elements in a defined averaging area 150 of substrate 100. Averaging region 150 has an averaging region area that is a small fraction of the area of substrate 110. In an example, the shape-defining elements 22 of the one of the pattern masks 21 has a density greater than the average density of optical elements specified for averaging region 150.

In block 88, the size of the variable aperture is set. In an example, the size of the variable aperture is set to a size that will provide the specified average density of optical elements in averaging region 150.

In block 90, averaging region 150 of substrate 110 and combined mask 26 are aligned with one another. In an example, substrate 110 is moved relative to combined mask 26 in directions parallel to the major surface of the substrate to align averaging region 150 with combined mask 26. In another example, combined mask 26 is moved relative to substrate 110 in directions parallel to the major surface of the substrate to align the combined mask with the averaging region.

In block 92, light is directed through the combined mask 26 such that the variable aperture limits the light beam in size and the selected pattern mask spatially modulates the light beam in intensity.

In block 94, the light from the combined mask is focused on the averaging region 150 of substrate 110 to form optical elements 160 in active sub-region 152 of the averaging region of the substrate. The optical elements 160 have an average density in averaging region 150 determined by the density of shape-defining elements 22 in the one of the pattern masks 21 and the size of variable aperture 18.

In block 96, a test is performed to determine whether optical elements have been formed in all of the averaging regions of the substrate in which optical elements are to be formed. A YES result causes the process 80 to terminate. A NO result causes operations to advance to block 98, where the position of the averaging region with which the combined mask 26 is aligned in block 90 is changed and blocks 86-96 are repeated. During some repetitions, the one of the pattern masks juxtaposed with the variable aperture and the size of the variable aperture remain unchanged. During other repetitions, one or both of the one of the pattern masks juxtaposed with the variable aperture is changed in block 86 and the size of variable aperture 18 is changed in block 88 to change the average density of the optical elements 160 formed in respective averaging region 150 of substrate 110. The average densities of the optical elements 160 vary among the averaging regions 150 in increments that are small compared to the first density increments.

The process 80 can be performed to make a light guide 100 that includes optical elements 160 distributed over all or a portion of the major surface 120 of substrate 110, with defined variations in average density over the major surface. The optical elements 160 are configured to extract light from light guide 100 with a defined intensity profile, such as a uniform intensity profile, over the relevant major surface of the light guide. The small increments in the average density of optical elements 160 can provide a very uniform intensity profile, or another defined intensity profile, over the major surface of the light guide.

In one embodiment, an inverse copy of the substrate 110 can be made by such techniques as using substrate 110 as a mold insert and molding the inverse copy, or using substrate 110 as an embossing die and embossing a blank substrate or film to form the inverse copy, or electroplating the substrate with metal to form the inverse copy. An inverse copy has optical elements that protrude from the major surface 120 of the substrate. The inverse copy may be a light guide or a light redirecting member or film, or a mold insert or embossing die used to make light guides or light redirecting members or films. Light guides or light redirecting members or films made using an inverse copy has optical elements that are indentations in the major surface 120 of the substrate.

A normal copy of substrate 110 having normal optical elements 160 may be manufactured by making an inverse copy using any of the techniques exemplified above and subjecting the inverse copy and any of the copying techniques exemplified above to form the normal copy. The normal copy of substrate 110 may be used as a tool to make light guides or light redirecting members or films having inverse (protruding) optical elements, which are preferred over normal optical elements in some applications. In an example in which substrate 110 is a mold insert (or die) that has optical elements 160 formed therein or thereon, injection molding techniques or other suitable manufacturing techniques may be utilized to form light guide 100.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

What is claimed is:

1. A method of forming optical elements in a substrate, the method comprising:
    providing a variable aperture;
    providing a pattern mask set comprising pattern masks, each of the pattern masks comprising shape-defining elements, each of the pattern masks having a respective density of the shape-defining elements and differing from one another in density of the shape-defining elements by first density increments;
    juxtaposing one of the pattern masks with the variable aperture to form a combined mask including the shape-defining elements at the respective density of the one of the pattern masks for forming the optical elements in a defined averaging region of the substrate, the averaging region having an averaging region area that is a small fraction of a substrate area;
    setting a size of the variable aperture;
    aligning the averaging region of the substrate and the combined mask with one another;
    directing a light beam through the aperture and the one of the pattern masks of the combined mask such that the variable aperture limits the light beam in size and the selected pattern mask spatially modulates the light beam in intensity in accordance with the density of the shape-defining elements in the one of the pattern masks;

focusing the light from the combined mask onto the averaging region of the substrate to form optical elements in an active sub-region of the averaging region, the optical elements having an average density within the averaging region determined by the density of the shape-defining elements in the one of the pattern masks and the size of the variable aperture;

repeating the juxtaposing, the setting, the aligning, the directing and the focusing with different combinations of the size of the variable aperture and the one of the pattern masks with respective averaging regions of the substrate to form optical elements in the substrate, wherein the optical elements have average densities that vary among the averaging regions in increments that are small compared to the first density increments.

2. The method of claim 1, wherein the shape-defining elements are defined in grayscale.

3. The method of claim 1, wherein pattern masks in the pattern mask set are substantially smaller in number than desired variations in the average density of the optical elements formed in the substrate.

4. The method of claim 1, wherein the substrate is a substrate of a light guide.

5. The method of claim 1, wherein the substrate is a substrate of a light redirecting member.

6. A method of making an inverse copy substrate comprising inverse optical elements, the method comprising:
making a substrate according to the method of claim 1; and
making an inverse copy of the substrate to form the inverse copy substrate.

7. The method of claim 6, additionally comprising using the inverse copy substrate as a tool to make a light guide or a light redirecting member.

8. A method of making a normal copy substrate comprising normal optical elements, the method comprising:
making an inverse copy substrate according to the method of claim 6; and
making an inverse copy of the inverse copy substrate to form the normal copy substrate.

9. The method of claim 8, additionally comprising using the normal copy substrate as a tool to make a light guide or a light redirecting member.

10. A laser micromachining system for patterning a substrate with optical elements, the system comprising:
a variable aperture;
a mask set comprising:
a pattern mask set comprising pattern masks, each of the pattern masks comprising shape-defining elements, each of the pattern masks having a respective density of the shape-defining elements and differing from one another in density of the shape-defining elements by first density increments;
wherein juxtaposition of each one of the pattern masks of the pattern mask set with different sizes of the variable aperture provides respective combined masks, each combined mask including the shape-defining elements of one of the pattern masks at one of the respective densities;
a combined mask configurator to receive the pattern mask set, to juxtapose a selected one of the pattern masks with the variable aperture to form a combined mask, and to define the size of the variable aperture;
a positioning system configured to align the combined mask and an averaging region of the substrate with one another;
a light source to direct a light beam through the aperture and the one of the pattern masks of the combined mask such that the variable aperture limits the light beam in size and the selected pattern mask spatially modulates the light beam in intensity in accordance with the density of the shape-defining elements in the one of the pattern masks; and
a focusing element to focus light from the combined mask on the averaging region of the substrate to form optical elements defined by the shape-defining elements in an active sub-region of the averaging region of the substrate, the optical elements having an average density within the averaging region, the average density determined by the density of the shape-defining elements in the selected one of the pattern masks and the defined size of the variable aperture, the average densities within the averaging regions differing among the averaging regions by increments that are small compared to the first density increments.

11. The laser micromachining system of claim 10 additionally comprising a controller to control intensity of the light beam or a number and/or duration of pulses of the light beam to vary depth and/or geometry of the optical elements.

12. The laser micromachining system of claim 10, wherein the averaging regions are separated from one another on the substrate by a pitch, and the variable aperture has a maximum size less than the pitch.

13. The laser micromachining system of claim 10, additionally comprising a controller to receive an input specifying average densities for the averaging regions and to control the laser light source, the combined mask configurator and the positioning system to obtain the specified average densities of corresponding optical elements in the substrate.

14. A method of forming optical elements in a substrate, the method comprising:
providing a variable aperture;
providing a pattern mask set comprising pattern masks, each of the pattern masks comprising shape-defining elements, the pattern masks differing from one another in density of the shape-defining elements by first density increments;
juxtaposing one of the pattern masks with the variable aperture to form a combined mask for forming the optical elements in a defined averaging region of the substrate, the averaging region having an averaging region area that is a small fraction of a substrate area;
setting a size of the variable aperture;
aligning the averaging region of the substrate and the combined mask with one another;
directing a light beam through the combined mask such that the variable aperture limits the light beam in size and the selected pattern mask spatially modulates the light beam in intensity;
focusing the light from the combined mask onto the averaging region of the substrate to form optical elements in an active sub-region of the averaging region, the optical elements having an average density within the averaging region determined by the density of the shape-defining elements in the one of the pattern masks and the size of the variable aperture;
repeating the juxtaposing, the setting, the aligning, the directing and the focusing with different combinations of the size of the variable aperture and the one of the pattern masks with respective averaging regions of the substrate to form optical elements in the substrate, wherein the optical elements have average densities that vary among the averaging regions in increments that are small compared to the first density increments;

wherein the substrate is a substrate of a light guide, a substrate of a light redirecting member, or a tool to directly or indirectly make a light guide or a light redirecting member.

15. The method of claim 14, wherein the substrate is the substrate of a light guide.

16. The method of claim 14, wherein the substrate is the substrate of a light redirecting member.

17. The method of claim 14, wherein the substrate is the tool to directly or indirectly make a light guide or a light redirecting member.

18. A laser micromachining system for patterning a substrate with optical elements, the system comprising:

a variable aperture;

a mask set comprising:

a pattern mask set comprising pattern masks, each of the pattern masks comprising shape-defining elements, the pattern masks differing from one another in density of the shape-defining elements by first density increments;

wherein juxtaposition of each one of the pattern masks of the pattern mask set with different sizes of the variable aperture provides respective combined masks each having an average density of the shape-defining elements determined by the density of the shape-defining elements in the one of the pattern masks and the size of the variable aperture such that the average densities of the shape-defining elements differ among the combined masks by increments that are small compared to the first density increments;

a combined mask configurator to receive the pattern mask set, to juxtapose a selected one of the pattern masks with the variable aperture to form a combined mask, and to define the size of the variable aperture;

a positioning system configured to align the combined mask and an averaging region of the substrate with one another;

a light source to direct a light beam through the combined mask such that the variable aperture limits the light beam in size and the selected pattern mask spatially modulates the light beam in intensity; and a focusing element to focus light from the combined mask on the averaging region of the substrate to form optical elements defined by the shape-defining elements in an active sub-region of the averaging region of the substrate, the optical elements having an average density within the averaging region, the average density determined by the density of the shape-defining elements in the selected one of the pattern masks and the defined size of the variable aperture, the average densities within the averaging regions differing among the averaging regions by increments that are small compared to the first density increments, wherein the substrate is a substrate of a light guide, a substrate of a light redirecting member, or a tool to directly or indirectly make a light guide or a light redirecting member.

19. The laser micromachining system of claim 18, wherein the substrate is the substrate of a light guide.

20. The laser micromachining system of claim 18, wherein the substrate is the substrate of a light redirecting member.

21. The laser micromachining system of claim 18, wherein the substrate is the tool to directly or indirectly make a light guide or a light redirecting member.

* * * * *